(12) United States Patent
Yao

(10) Patent No.: US 9,751,954 B2
(45) Date of Patent: Sep. 5, 2017

(54) RESIN COMPOSITION AND RESIN MOLDED ARTICLE

(71) Applicant: FUJI XEROX CO., LTD., Tokyo (JP)

(72) Inventor: Kenji Yao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 9 days.

(21) Appl. No.: 14/834,974

(22) Filed: Aug. 25, 2015

(65) Prior Publication Data

US 2016/0280803 A1 Sep. 29, 2016

(30) Foreign Application Priority Data

Mar. 26, 2015 (JP) .................. 2015-064761

(51) Int. Cl.
- *C08B 15/00* (2006.01)
- *C08B 3/00* (2006.01)
- *C08B 3/16* (2006.01)
- *C08L 1/02* (2006.01)
- *C08L 1/10* (2006.01)

(52) U.S. Cl.
CPC .................. *C08B 3/00* (2013.01); *C08B 3/16* (2013.01); *C08L 1/02* (2013.01); *C08L 1/10* (2013.01)

(58) Field of Classification Search
CPC .................................................. C08B 15/00
See application file for complete search history.

(56) References Cited

U.S. PATENT DOCUMENTS

| | | | | | |
|---|---|---|---|---|---|
| 2,365,652 | A | * | 12/1944 | Stern | ........................ C08K 5/09 106/170.26 |
| 4,209,340 | A | * | 6/1980 | Yabune | .................. C08K 5/524 106/170.15 |
| 7,390,434 | B2 | * | 6/2008 | Tsujimoto | ............... B29C 41/28 252/299.01 |
| 8,101,108 | B2 | * | 1/2012 | Otoshi | ................ B29C 47/0004 264/1.34 |
| 2012/0165517 | A1 | | 6/2012 | Uehira et al. | |

FOREIGN PATENT DOCUMENTS

| | | |
|---|---|---|
| JP | 2007-051304 A | 3/2007 |
| JP | 2011-057959 A | 3/2011 |
| JP | 2014-012852 A | 1/2014 |

OTHER PUBLICATIONS

Sep. 20, 2016 Office Action issued in Japanese Patent Application No. 2015-064761.
Dec. 6, 2016 Office Action issued in Japanese Patent Application No. 2015-064761.

* cited by examiner

*Primary Examiner* — Melvin C Mayes
*Assistant Examiner* — Stefanie Cohen
(74) *Attorney, Agent, or Firm* — Oliff PLC

(57) ABSTRACT

A resin composition includes a cellulose derivative, wherein a Hazen color number (APHA) of the resin composition is 50 or lower.

19 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2015-064761 filed Mar. 26, 2015.

BACKGROUND

1. Technical Field

The invention relates to a resin composition and a resin molded article.

2. Related Art

In the past, various kinds of resin compositions were provided, and used for preparing a resin molded article.

Recently, use of resins derived from plants has been considered, and a cellulose derivative is one of the resins derived from plants.

SUMMARY

According to an aspect of the invention, there is provided a resin composition including:

a cellulose derivative, wherein a Hazen color number (APHA) of the resin composition is 50 or lower.

DETAILED DESCRIPTION

Hereinafter, exemplary embodiments which are examples of the invention are described. These exemplary embodiments and examples exemplify the invention, and do not intend to limit the scope of the invention.

With respect to the amount of each component to be contained in a composition as described in the specification, if plural kinds of materials exist as a certain component in the composition, the amount mean a total amount of the plural kinds of materials existing in the composition, unless described otherwise.

Resin Composition

The resin composition according to the exemplary embodiment includes a cellulose derivative, in which a Hazen color number (APHA) indicating a hue is 50 or lower.

Here, the "cellulose derivative" used in the exemplary embodiment refers to a compound in which at least one hydroxyl group included in cellulose is substituted with a substituent.

In addition, the Hazen color number (APHA) indicating a hue (hereinafter, simply referred to as "Hazen color number") is an index of indicating a degree of coloration in a resin composition. A small Hazen color number means a degree of coloration is low, that is, transparency is high. Therefore, the resin composition according to the exemplary embodiment has a Hazen color number of 50 or lower, and thus transparency is high.

According to the exemplary embodiment, a resin molded article in which the generation of bad odor is reduced may be obtained by using and molding a resin composition having a Hazen color number of 50 or lower.

The reason therefore is not clear, but it is assumed as follows.

In the past, it is known that, if cellulose is used by being thermally fluidized and molded (for example, used for injection molding), a cellulose derivative is used in order to enhance the thermal fluidity. The cellulose derivative may be obtained, for example, by causing cellulose to react with acid and causing a portion of a hydroxyl group to be substituted with a substituent (for example, acyl group) derived from acid. If molding is performed by using the resin composition including the cellulose derivative, the thermal fluidity is improved. However, the acid used in the reaction with the cellulose and the portion of the substituent derived from the acid are degraded (desorbed), and thus bad odor is easily generated from the obtained resin molded article. Hereinafter, if the acid used in the reaction with the cellulose is degraded or the substituent derived from the acid is degraded, the degraded acid and the degraded substituent are called "desorbed acid" in the following description.

It is considered that the desorbed acid is easily generated, for example, when a cellulose derivative is synthesized, when a resin composition including a cellulose derivative is melted and kneaded, or when the resin composition is molded. It is considered that bad odor from the resin molded article is generated because the desorbed acid remains inside the resin molded article and slowly released from the resin molded article.

On the contrary, in the resin composition according to the exemplary embodiment, transparency of the cellulose derivative increases such that a Hazen color number of the resin composition is 50 or lower.

It is considered that, if the Hazen color number of the resin composition is 50 or lower, molecular chains of the cellulose derivative are irregularly (hereinafter, referred to as "random") disposed in the chemical structure. If the molecular chains of the cellulose derivative are randomly disposed, substituents of the cellulose derivative are also randomly disposed. According to this chemical structure, for example, when the cellulose derivative is synthesized, when the resin composition including the cellulose derivative is melted and kneaded, or when the resin composition is molded, it is difficult that load is locally applied to the substituents, and the interaction between the substituents is prevented, and thus it is difficult that the substituents are degraded.

In addition, since the molecular chains of the cellulose derivative are randomly disposed, gaps are easily generated between the molecular chains. Accordingly, even if the acid used in the reaction with the cellulose or the substituent derived from the acid is degraded, it is difficult that the desorbed acid remains in the resin molded article.

From the above, a resin molded article in which the generation of bad odor is reduced may be obtained by molding the resin composition according to the exemplary embodiment.

In addition, since the resin composition according to the exemplary embodiment includes the cellulose derivative in which at least one hydroxyl group is substituted, thermal fluidity at the time of molding is secured.

Hazen Color Number (APHA)

The Hazen color number (APHA) in the resin composition according to the exemplary embodiment is a value measured in conformity with JIS K0071-1 (1998).

The Hazen color number in the resin composition according to the exemplary embodiment is 50% or lower, preferably 40% or lower, and more preferably 30% or lower. If the Hazen color number (APHA) is in the range described above, a resin molded article in which the generation of bad odor is reduced may be easily obtained. In addition, since the external gloss when a molded article is formed is not too high, the lower limit of the Hazen color number in the resin composition according to the exemplary embodiment is preferably, for example, 5% or greater.

Hereinafter, components of the resin composition according to the exemplary embodiment are described in detail.

Cellulose Derivative

The cellulose derivative used in the exemplary embodiment is described.

The cellulose derivative used in the exemplary embodiment is not particularly limited, but from a viewpoint of reducing a Hazen color number of the resin composition, a weight average molecular weight, a molecular structure, a content in the resin composition, and the like are preferably in the range described below.

Weight Average Molecular Weight

The weight average molecular weight of the cellulose derivative is preferably 10,000 or greater and less than 75,000, and more preferably in the range of 20,000 to 50,000.

If the weight average molecular weight is 10,000 or greater and less than 75,000, the molecular chains and the substituents of the cellulose derivative are randomly disposed easily, and the Hazen color number of the resin composition is easily adjusted to 50% or lower. Accordingly, the interaction of the substituents is prevented, and thus it is difficult that the substituents are degraded. As a result, the generation of bad odor of the obtained resin molded article is reduced.

Here, the weight average molecular weight (Mw) is a value measured by gel permeation chromatography (GPC). Specifically, the molecular weight measurement by GPC is performed with a GPC apparatus (manufactured by Tosoh corporation, HLC-8320GPC, Column: TSKgel α-M) by using a solution of dimethylacetamide/lithium chloride having a volume ratio of 90/10.

Structures

As the cellulose derivative, a compound in which at least one hydroxyl group included in cellulose is substituted with an acyl group is preferable, and specifically, the compound represented by the formula (1) described below is preferable.

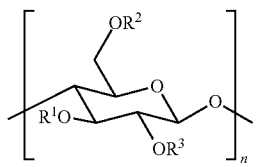

(1)

In the formula (1), $R^1$, $R^2$, and $R^3$ each independently represent a hydrogen atoms or an acyl group. n represents an integer of 2 or greater. However, at least one of plural $R^1$s, plural $R^2$s, and plural $R^3$s represents an acyl group.

With respect to the compound represented by the formula (1), if plural acyl groups exist, the plural acyl groups all may be identical, partially may be identical, and all may be different from each other.

The range of n is not particularly limited, and may be determined according to a preferable range of the weight average molecular weight described above. Specifically, n is preferably in the range of 40 to 300, and more preferably in the range of 100 to 200.

If n is in the range of 40 to 300, the molecular chains and the substituents of the cellulose derivative are randomly disposed easily, and the Hazen color number of the resin composition is easily adjusted to 50% or lower.

From the viewpoint that a resin molded article in which the generation of bad odor is reduced is easily obtained, the acyl groups represented by $R^1$, $R^2$, and $R^3$ are preferably acyl groups having 1 to 6 carbon atoms, more preferably acyl groups having 1 to 4 carbon atoms, and still more preferably acyl groups having 1 to 3 carbon atoms.

With respect to plural $R^1$s, plural $R^2$s, or plural $R^3$s in the cellulose derivative, all may be identical, partially may be identical, or all may be different from each other.

The acyl group having 1 to 6 carbon atoms is represented by a structure of "—CO—$R_{AC}$", and "$R_{AC}$" represents a hydrogen atom or a hydrocarbon group having 1 to 5 carbon atoms.

The hydrocarbon group represented by "$R_{AC}$" may have any one of a straight chain shape, a branched shape, or a cyclic shape, but preferably a straight chain shape.

The hydrocarbon group may be a saturated hydrocarbon group or an unsaturated hydrocarbon group, but preferably a saturated hydrocarbon group.

The hydrocarbon group may contain other atoms (for example, oxygen or nitrogen) than carbon or hydrogen, but preferably a hydrocarbon group made of only carbon and hydrogen.

As the acyl group having 1 to 6 carbon atoms, a formyl group, an acetyl group, a propionyl group, a butanoyl group, a propenoyl group, a hexanoyl group, and the like are included.

Among them, as an acyl group, from the viewpoints that a resin molded article in which generation of bad odor is reduced may be easily obtained and the moldability of the resin composition is enhanced, an acetyl group is preferable.

Substitution Degree

From the viewpoints that thermal fluidity when the resin composition including the cellulose derivative is molded is secured, and a resin molded article in which the generation of bad odor is reduced may be easily obtained, the substitution degree of the cellulose derivative is preferably in the range of 1.8 to 2.5, more preferably in the range of 2.0 to 2.5, and still more preferably in the range of 2.2 to 2.5.

In addition, the substitution degree is an index indicating the degree to which the hydroxyl group included in cellulose is substituted with the substituent. As described above, if the substituent is an acyl group, the substitution degree is an index indicating a degree of acylation of a cellulose derivative. Specifically, the substitution degree means an intramolecular average of the number of substitutions with an acyl group with respect to three hydroxyl groups included in a D-glucopyranose unit of the cellulose derivative.

Preparation Method

A method of preparing the cellulose derivative used in the exemplary embodiment is not particularly limited, and a well-known method may be employed.

Hereinafter, the method of preparing the cellulose derivative (hereinafter, referred to as "specific cellulose derivative") in which the weight average molecular weight is 10,000 or greater and less than 75,000, and at least one hydroxyl group of cellulose is substituted with an acyl group having 1 to 6 carbon atoms is described with reference to examples.

Adjustment of Molecular Weight of Cellulose

First, cellulose before acylation, that is, cellulose in which a hydroxyl group is not substituted with an acyl group is prepared, and the molecular weight thereof is adjusted.

As the cellulose before acylation, a synthesized product may be used, or a commercially available product may be used. In addition, the cellulose is a resin derived from plants, and the weight average molecular weight thereof is generally higher than the specific cellulose derivative in the exemplary embodiment. Therefore, the adjustment of the molecular weight of the cellulose is generally a step of decreasing the molecular weight.

For example, the weight average molecular weight of the commercially available cellulose is generally in the range of 150,000 to 500,000.

As the commercially available cellulose before acylation, for example, KC Flock (W50, W100, W200, W300G, W400G, W-100F, W60MG, W-50GK, W-100GK), NDPT, NDPS, LNDP, and NSPP-HR manufactured by Nippon Paper Industries Co., Ltd. are included.

A method of adjusting a molecular weight of the cellulose before acylation is not particularly limited, and, for example, a method of decreasing a molecular weight by stirring the cellulose in liquid, and the like are included.

By adjusting the speed and the time when the cellulose is stirred, the molecular weight of the cellulose may be adjusted to a required value. In addition, though not particularly limited, the stirring speed when the cellulose is stirred is preferably in the range of 50 rpm to 3,000 rpm, and more preferably in the range of 100 rpm to 1,000 rpm. In addition, the stirring time is preferably in the range of 2 hours to 48 hours, and more preferably in the range of 5 hours to 24 hours.

In addition, as the liquid used when the cellulose is stirred, an aqueous solution of hydrochloric acid, an aqueous solution of formic acid, an aqueous solution of acetic acid, an aqueous solution of nitric acid, and an aqueous solution of sulfuric acid are included.

Preparation of Cellulose Derivative

The cellulose of which the molecular weight is adjusted by the method described above is acylated by an acyl group having 1 to 6 carbon atoms in a well-known method, so as to obtain the specific cellulose derivative.

For example, if at least one hydroxyl group included in the cellulose is substituted with an acetyl group, a method of esterifying the cellulose by using a mixture of acetic acid, acetic anhydride, and sulfuric acid, and the like are included. In addition, if at least one hydroxyl group is substituted with a propionyl group, a method of esterifying the cellulose by using propionic anhydride instead of acetic anhydride in the mixture, and the like are included. If at least one hydroxyl group is substituted with a butanoly group, a method of esterifying the cellulose by using butyric anhydride instead of acetic anhydride in the mixture are included. If at least one hydroxyl group is substituted with a hexanoyl group, a method of esterifying the cellulose by using hexanoic anhydride instead of acetic anhydride in the mixture are included.

After acylation, in order to adjust the substitution degree, a step of deacylation may be further provided. In addition, a refining step may be further provided after the acylation step or the deacylation step.

Ratio Occupied by Cellulose Derivative in Resin Composition

In the resin composition according to the exemplary embodiment, in order to cause the function of the cellulose derivative to be easily revealed, a ratio occupied by the cellulose derivative with respect to the total amount of the resin composition is preferably 70% by weight or greater, more preferably 80% by weight or greater, and may be 100% by weight. If the ratio is 70% by weight or greater, a resin molded article in which the generation of bad odor is reduced may be easily obtained.

Plasticizer

The resin composition according to the exemplary embodiment may further contain a plasticizer.

In addition, the content of the plasticizer is preferably an amount in which a ratio occupied by the cellulose derivative with respect to a total amount of the resin composition is in the range described above. Specifically, the ratio occupied by the plasticizer with respect to the total amount of the resin composition is preferably 15% by weight or lower, more preferably 10% by weight or lower, and still more preferably 5% by weight or lower. If the ratio of the plasticizer is in the range described above, the bleeding of the plasticizer is easily prevented.

For example, as the plasticizer, an adipic acid ester-containing compound, a polyether ester compound, a sebacic acid ester compound, a glycol ester compound, an acetic acid ester, a dibasic acid ester compound, a phosphoric acid ester compound, a phthalic acid ester compound, camphor, citric acid ester, stearic acid ester, metallic soap, polyol, polyalkylene oxide, and the like are exemplified.

Among these, an adipic acid ester-containing compound, and a polyether ester compound are preferable, and an adipic acid ester-containing compound is more preferable.

Adipic Acid Ester-Containing Compound

An adipic acid ester-containing compound (compound containing adipic acid ester) refers to a compound of individual adipic acid esters, and a mixture of adipic acid ester and components other than adipic acid ester (compound different from adipic acid ester). However, the adipic acid ester-containing compound may preferably contain the adipic acid ester by 50% by weight or more with respect to the total of adipic acid ester and other components.

As the adipic acid ester, for example, an adipic acid diester, and an adipic acid polyester are exemplified. Specifically, an adipic acid diester represented by the formula (2-1) and an adipic acid polyester represented by the formula (2-2) are exemplified.

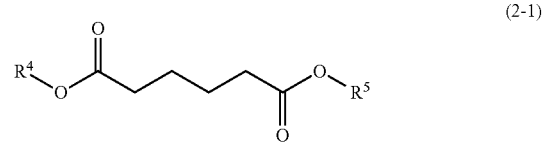

(2-1)

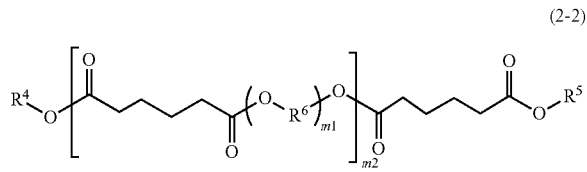

(2-2)

In the formulae (2-1) and (2-2), $R^4$ and $R^5$ each independently represents an alkyl group, or a polyoxyalkyl group $[-(C_xH_{2x}-O)_y-R^{41}]$ (provided that $R^{41}$ represents an alkyl group, x represents an integer in the range of 1 to 10, and y represents an integer in the range of 1 to 10.).

$R^6$ represents an alkylene group.

m1 represents an integer in the range of 1 to 20.

m2 represents an integer in the range of 1 to 10.

In the formulae (2-1) and (2-2), the alkyl groups represented by $R^4$ and $R^5$ are preferably alkyl groups having 1 to 6 carbon atoms, and more preferably alkyl groups having 1 to 4 carbon atoms. The alkyl groups represented by $R^4$ and $R^5$ may have any one of a linear shape, a branched shape, or a cyclic shape, but preferably a linear shape and a branched shape.

In the formulae (2-1) and (2-2), in the polyoxyalkyl group represented by $R^4$ and $R^5$ $[-(C_xH_{2x}-O)_y-R^{41}]$, the alkyl group represented by $R^{41}$ is preferably an alkyl group having 1 to 6 carbon atoms, and more preferably an alkyl group having 1 to 4 carbon atoms. The alkyl group represented by $R^{41}$ may have any one of a linear shape, a branched shape, or a cyclic shape, but preferably a linear shape and a branched shape.

In the formula (2-2), the alkylene group represented by $R^6$ is preferably an alkylene group having 1 to 6 carbon atoms, and more preferably an alkylene group having 1 to 4 carbon atoms. The alkylene group represented by $R^6$ may have any one of a linear shape, a branched shape, or a cyclic shape, but preferably a linear shape and a branched shape.

In the formulae (2-1) and (2-2), the group represented by each of $R^4$ to $R^6$ may be substituted with a substituent. As the substituent, an alkyl group, an aryl group, and a hydroxyl group are exemplified.

The molecular weight of the adipic acid ester (or weight average molecular weight) is preferably in the range of 200 to 5,000, and more preferably in the range of 300 to 2,000. The weight average molecular weight is a value measured according to the method of measuring the weight average molecular weight of the cellulose derivative described above.

Specific examples of the adipic acid ester-containing compound are described below, but the invention is not limited thereto.

|  | Name of Material | Name of Product | Manufacturer |
| --- | --- | --- | --- |
| ADP1 | Adipic acid diester | Daifatty 101 | Daihachi Chemical Industry Co., Ltd. |
| ADP2 | Adipic acid diester | Adeka Cizer RS-107 | ADEKA Corporation |
| ADP3 | Adipic acid polyester | Polycizer W-230-H | DIC Corporation |

Polyether Ester Compound

As the polyether ester compound, for example, a polyether ester compound represented by the formula (2) is exemplified.

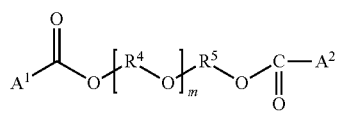

(2)

In the formula (2), $R^4$ and $R^5$ each independently represents an alkylene group having 2 to 10 carbon atoms. $A^1$ and $A^2$ each independently represents an alkyl group having 1 to 6 carbon atoms, an aryl group having 6 to 12 carbon atoms, or an aralkyl group having 7 to 18 carbon atoms. m represents an integer of 1 or greater.

In the formula (2), as the alkylene group represented by $R^4$, an alkylene group having 3 to 10 carbon atoms is preferable, and an alkylene group having 3 to 6 carbon atoms is more preferable. The alkylene group represented by $R^4$ may have any one of a linear shape, a branched shape, or a cyclic shape, but preferably a linear shape.

If the number of carbons of the alkylene group represented by $R^4$ is set to be 3 or greater, the decrease of the fluidity of the resin composition is prevented, and thermoplasticity is easily exhibited. If the number of carbons of the alkylene group represented by $R^4$ is 10 or lower, or the alkylene group represented by $R^4$ has a linear shape, the affinity to the cellulose derivative is easily enhanced. Therefore, if the alkylene group represented by $R^4$ has a linear shape, and the number of carbons is in the range described above, moldability of the resin composition is enhanced.

In this point of view, particularly, the alkylene group represented by $R^4$ is preferably a n-hexylene group ($-(CH_2)_6-$). That is, the polyether ester compound is preferably a compound where $R^4$ represents a n-hexylene group ($-(CH_2)_6-$).

In the formula (2), as the alkylene group represented by $R^5$, an alkylene group having 3 to 10 carbon atoms is preferable, and an alkylene group having 3 to 6 carbon atoms is more preferable. The alkylene group represented by $R^5$ may have any one of a linear shape, a branched shape, or a cyclic shape, but preferably a linear shape.

If the number of carbons of the alkylene group represented by $R^5$ is 3 or greater, the decrease of the fluidity of the resin composition is prevented, and the thermoplasticity is easily exhibited. If the number of carbons of the alkylene group represented by $R^5$ is 10 or lower, or if the alkylene group represented by $R^5$ has a linear shape, the affinity to the cellulose derivative is easily enhanced. Therefore, if the alkylene group represented by $R^5$ has a linear shape, and the number of carbons is in the range described above, moldability of the resin composition is enhanced.

In this point of view, particularly, the alkylene group represented by $R^5$ is preferably a n-butylene group ($-(CH_2)_4-$). That is, the polyether ester compound is preferably a compound where $R^5$ represents a n-butylene group ($-(CH_2)_4-$).

In the formula (2), the alkyl groups represented by $A^1$ and $A^2$ are alkyl groups having 1 to 6 carbon atoms, and alkyl groups having 2 to 4 carbon atoms are more preferable. The alkyl groups represented by $A^1$ and $A^2$ may have any one of a linear shape, a branched shape, or a cyclic shape, but preferably a branched shape.

The aryl groups represented by $A^1$ and $A^2$ are aryl groups having 6 to 12 carbon atoms, and as examples thereof, an unsubstituted aryl group such as a phenyl group and a naphthyl group or a substituted phenyl group such as a t-butylphenyl group and a hydroxyphenyl group are exemplified.

The aralkyl group represented by $A^1$ and $A^2$ is a group represented by $-R^A$-Ph. $R^A$ represents a linear-shaped or branched alkylene group having 1 to 6 carbon atoms (preferably, having 2 to 4 carbon atoms). Ph represents an unsubstituted phenyl group or a substituted phenyl group which is substituted with the linear-shaped or branched alkyl group having 1 to 6 carbon atoms (preferably, having 2 to 6 carbon atoms). As the aralkyl group, specifically, for example, an unsubstituted aralkyl group such as a benzil group, a phenylmethyl group (phenethyl group), a phenylpropyl group, and a phenylbutyl group, and a substituted aralkyl group such as a methylbenzil group, a dimethylbenzil group, and a methylphenethyl group are exemplified.

At least one of $A^1$ and $A^2$ preferably represents an aryl group or an aralkyl group. That is, the polyether ester compound is preferably a compound where at least one of $A^1$ and $A^2$ represents an aryl group (preferably, phenyl group) or an aralkyl group, and preferably a compound where both of $A^1$ and $A^2$ represent an aryl group (preferably, phenyl group) or an aralkyl group.

Subsequently, characteristics of the polyether ester compound are described.

The weight average molecular weight (Mw) of the polyether ester compound is preferably in the range of 450 to 650, and more preferably in the range of 500 to 600.

If the weight average molecular weight (Mw) is 450 or greater, bleeding (phenomenon of deposition) becomes difficult. If the weight average molecular weight (Mw) is 650 or lower, the affinity to the cellulose derivative is easily enhanced. Therefore, if the weight average molecular weight (Mw) is in the range described above, moldability of the resin composition is enhanced.

In addition, the solubility parameter (SP value) employs $(cal/cm^3)^{1/2}$ as a unit, but the unit is omitted in conformity with practice, and is described in a dimensionless manner.

Hereinafter, specific examples of the polyether ester compound are described, but the invention is not limited thereto.

| | $R^4$ | $R^5$ | $A^1$ | $A^2$ | Mw | Viscosity (25° C.) | APHA | SP value |
|---|---|---|---|---|---|---|---|---|
| PEE1 | —$(CH_2)_6$— | —$(CH_2)_4$— | Phenyl group | Phenyl group | 550 | 43 | 120 | 9.7 |
| PEE2 | —$(CH_2)_2$— | —$(CH_2)_4$— | Phenyl group | Phenyl group | 570 | 44 | 115 | 9.4 |
| PEE3 | —$(CH_2)_{10}$— | —$(CH_2)_4$— | Phenyl group | Phenyl group | 520 | 48 | 110 | 10.0 |
| PEE4 | —$(CH_2)_6$— | —$(CH_2)_2$— | Phenyl group | Phenyl group | 550 | 43 | 115 | 9.3 |
| PEE5 | —$(CH_2)_6$— | —$(CH_2)_{10}$— | Phenyl group | Phenyl group | 540 | 45 | 115 | 10.1 |
| PEE6 | —$(CH_2)_6$— | —$(CH_2)_4$— | t-Butyl group | t-Butyl group | 520 | 44 | 130 | 9.7 |
| PEE7 | —$(CH_2)_6$— | —$(CH_2)_4$— | Phenyl group | Phenyl group | 460 | 45 | 125 | 9.7 |
| PEE8 | —$(CH_2)_6$— | —$(CH_2)_4$— | Phenyl group | Phenyl group | 630 | 40 | 120 | 9.7 |
| PEE9 | —$(CH_2)_6$— | —$(CH_2)_4$— | Phenyl group | Phenyl group | 420 | 43 | 135 | 9.7 |
| PEE10 | —$(CH_2)_6$— | —$(CH_2)_4$— | Phenyl group | Phenyl group | 670 | 48 | 105 | 9.7 |
| PEE11 | —$(CH_2)_6$— | —$(CH_2)_4$— | Phenyl group | Phenyl group | 550 | 35 | 130 | 9.7 |
| PEE12 | —$(CH_2)_6$— | —$(CH_2)_4$— | Phenyl group | Phenyl group | 550 | 49 | 125 | 9.7 |
| PEE13 | —$(CH_2)_6$— | —$(CH_2)_4$— | Phenyl group | Phenyl group | 550 | 32 | 120 | 9.7 |
| PEE14 | —$(CH_2)_6$— | —$(CH_2)_4$— | Phenyl group | Phenyl group | 550 | 53 | 105 | 9.7 |
| PEE15 | —$(CH_2)_6$— | —$(CH_2)_4$— | Phenyl group | Phenyl group | 550 | 43 | 135 | 9.7 |
| PEE16 | —$(CH_2)_6$— | —$(CH_2)_4$— | Phenyl group | Phenyl group | 550 | 43 | 105 | 9.7 |
| PEE17 | —$(CH_2)_6$— | —$(CH_2)_4$— | Phenyl group | Phenyl group | 550 | 43 | 150 | 9.7 |
| PEE18 | —$(CH_2)_6$— | —$(CH_2)_4$— | Phenyl group | Phenyl group | 550 | 43 | 95 | 9.7 |

In addition, the weight average molecular weight (Mw) of the polyether ester compound is a value measured by gel permeation chromatography (GPC). Specifically, the measurement of the molecular weight by GPC is performed by using HPLC1100 manufactured by Tosoh corporation as a measurement apparatus, and TSKgel GMHHR-M+TSKgel GMHHR-M (7.8 mm I.D. 30 cm) which is a column manufactured by Tosoh Corporation, with a chloroform solvent. Also, the weight average molecular weight is calculated by using a molecular weight calibration curve obtained by a monodispersed polystyrene standard sample from the measurement result.

The viscosity of the polyether ester compound at 25° C. is preferably in the range of 35 mPa·s to 50 mPa·s, and more preferably in the range of 40 mPa·s to 45 mPa·s.

If the viscosity is 35 mPa·s or greater, the dispersibility to the cellulose derivative is easily enhanced. If the viscosity is 50 mPa·s or lower, anisotropy of the dispersion of the polyether ester compound hardly appears. Therefore, if the viscosity is in the range described above, the moldability of the resin composition is enhanced.

In addition, the viscosity is a value measured by an E-type viscosmeter.

A solubility parameter (SP value) of the polyether ester compound is preferably in the range of 9.5 to 9.9, and more preferably in the range of 9.6 to 9.8.

If the solubility parameter (SP value) is in the range of 9.5 to 9.9, dispersibility to the cellulose derivative is easily enhanced.

The solubility parameter (SP value) is a value calculated by a Fedor method, and specifically, the solubility parameter (SP value) is, for example, calculated by the following equation in conformity with the description in Polym. Eng. Sci., vol. 14, p. 147 (1974).

$$\text{SP value} = \sqrt{(Ev/v)} = \sqrt{(\Sigma\Delta ei/\Sigma\Delta vi)} \quad \text{Equation:}$$

(In the equation, Ev: evaporation energy (cal/mol), v: molar volume (cm³/mol), Δei: evaporation energy of each atom or atom group, and Δvi: molar volume of each atom or atom group)

Other Components

The resin composition according to the exemplary embodiment may contain other components in addition to the components described above, if necessary. As the other components, for example, a flame retardant, a compatibilizer, an antioxidant, a release agent, a light resistant agent, a weather resistant agent, a colorant, pigments, a modifier, a drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride, and the like) are exemplified. The content of the respective components is in the range of 0% by weight to 5% by weight with respect to the total amount of the resin composition. Here, the expression "0% by weight" means not including other components.

The resin composition according to the exemplary embodiment may contain other resins in addition to the resin described above. However, the other resins are included in amounts with which the ratio of the cellulose derivative occupied in the total amount of the resin composition becomes in the range described above.

As the other resins, for example, the thermoplastic resins which are well-known in the art are included. Specifically, polycarbonate resin; polypropylene resin; polyester resin; a polyolefin resin; polyester carbonate resin; a polyphenylene ether resin; polyphenylene sulfide resin; a polysulfone resin; polyether sulfone resin; a polyarylene resin; a polyetherimide resin; a polyacetal resin; a polyvinyl acetal resin; a polyketone resin; a polyetherketone resin; a polyetheretherketone resin; a polyarylketone resin; a polyether nitrile resin; a liquid crystal resin; a polybenzimidazole resin; polyparabanic acid resin; a vinyl polymer or a vinyl copolymer resin obtained by polymerizing or copolymerizing one or more vinyl monomers selected from the group consisting of an aromatic alkenyl compound, a methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenylmaleimide copolymer resin; a vinyl cyanide-(ethylene-diene-propylene (EPDM))-aromatic alkenyl compound copolymer resin; a vinyl chloride resin; and a chlorinated vinyl chloride resin are exemplified. These resins may be used singly, or two or more types thereof may be used in combination.

Method of Preparing Resin Composition

The resin composition according to the exemplary embodiment is prepared, for example, by melting and kneading the mixture of the cellulose derivative and the components described above. In addition, the resin composition according to the exemplary embodiment is prepared by dissolving the components in a solvent. As a melting and kneading unit, well known units are included, and specifically, for example, a twin screw extruder, a Henschel mixer, a Banbury mixer, a single screw extruder, a multi-screw extruder, and a co-kneader are included.

In addition, the temperature at the time of kneading may be determined according to the melting temperature of the cellulose derivative used, but in view of the thermal decomposition and the fluidity, the temperature in the range of 140° C. to 240° C. is preferable, and the temperature in the range of 160° C. to 200° C. is more preferable.

Resin Molded Article

The resin molded article according to the exemplary embodiment includes the resin composition according to the exemplary embodiment. That is, the resin molded article according to the exemplary embodiment is made of the same composition as the resin composition according to the exemplary embodiment.

Specifically, the resin molded article according to the exemplary embodiment may be obtained by molding the resin composition according to the exemplary embodiment. As the molding method, injection molding, extrusion molding, blow molding, heat press molding, calendaring molding, coating molding, cast molding, dipping molding, vacuum molding, transfer molding and the like may be applied.

As the method of molding the resin molded article according to the exemplary embodiment, since degrees of freedom in shape are high, injection molding is preferable. With respect to injection molding, the resin composition is heated and melted, casted into a mold, and solidified, so as to obtain a molded article. The resin composition may be molded by injection compression molding.

The cylinder temperature of the injection molding is, for example, in the range of 140° C. to 240° C., preferably in the range of 150° C. to 220° C., and more preferably in the range of 160° C. to 200° C. The mold temperature of the injection molding is, for example, in the range of 30° C. to 120° C., and more preferably in the range of 40° C. to 80° C. The injection molding may be performed, for example, by using a commercially available apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., and SE50D manufactured by Toshiba Machine Co., Ltd.

The resin molded article according to the exemplary embodiment may be appropriately used for the purposes of electric and electronic apparatuses, business machines, home appliances, automobile interior materials, engine covers, car bodies, containers, and the like. More specifically, the resin molded article may be used in housings of electric and electronic apparatuses or home appliances; various components of electric and electronic apparatuses or home appliances; interior components of automobiles; storage cases of CD-ROM, DVD, and the like; food containers; drink bottles; food trays; wrapping materials; films; and sheets.

Examples

Hereinafter, the invention is described in greater detail with reference to examples, but the invention is not limited to the examples. In addition, unless described otherwise, the expression "part" refers to "part by weight".

Preparation of Cellulose 2 kg of cellulose (KC Flock W50 manufactured by Nippon Paper Industries Co., Ltd.) is put to 20 L of an aqueous solution of 0.1 M hydrochloric acid, and stirred at room temperature (25° C.). In stirring time shown in Table 1, cellulose in respective molecular weights is obtained. In addition, EP-1800 (product name, manufactured by Shinto Scientific Co., Ltd.) is used as a stirring apparatus, and the rotation speed at the time of stirring is set to 500 rpm.

The weight average molecular weight is measured with a GPC apparatus (manufactured by Tosoh corporation, HLC-8320GPC, Column: TSKgel α-M), by using a solution of dimethylacetamide/lithium chloride=90/10.

TABLE 1

|  | Stirring time (hr) | Weight average molecular weight |
| --- | --- | --- |
| Compound 1 | 0.3 | 75,500 |
| Compound 2 | 1 | 57,800 |
| Compound 3 | 2 | 31,000 |
| Compound 4 | 3 | 10,300 |
| Compound 5 | 5 | 9,400 |

Preparing of Cellulose Derivative

Acetylation Step

Pretreatment activation is performed by spraying 1 kg of Compound 1 in Table 1, with 500 g of glacial acetic acid. Thereafter, a mixture of 3.8 kg of glacial acetic acid, 2.4 kg of acetic anhydride, and 80 g of sulfuric acid is added, and esterification of Compound 1 is performed while the mixture is stirred and mixed at a temperature of 40° C. or lower. Esterification is finished when fiber fragments disappear.

Deacetylation Step 2 kg of acetic acid and 1 kg of water are added to the mixture, and stirred for 2 hours at room temperature (25° C.)

Refinement Step

Further, this solution is slowly dripped to a solution obtained by dissolving 20 kg of sodium hydroxide in 40 kg of water while the solution is stirred. The obtained white precipitate is suction-filtered and washed with 60 kg of water, and a cellulose derivative (Compound 6) is obtained.

Cellulose derivatives (Compounds 7 to 10) are obtained in the same manner as described above except for changing Compound 1 to Compounds 2 to 5.

A cellulose derivative (Compound 11) is obtained in the same manner as described above except for using Compound 3 performing a refinement step right after an acetylation step is finished.

Cellulose derivatives (Compounds 12 to 16) are obtained in the same manner as described above except for using Compound 3 changing stirring time in deacetylation steps to 0.5 hours, 1 hour, 3 hours, 5 hours, and 10 hours, respectively.

Cellulose derivatives (Compounds 17 to 19) are obtained in the same manner as described above except for using Compound 3 and changing 2.4 kg of acetic anhydride in an acetylation step respectively to 2 kg of propionic anhydride/ 0.3 kg of acetic anhydride and 1.8 kg of n-butyric anhydride/6 kg of acetic anhydride and 0.5 kg of n-hexanoic anhydride.

Weight average molecular weights are obtained in the same manner as in Compound 1, and substitution degrees are obtained with $H^1$-NMR measurement (JNM-ECZR manufactured by JEOL Ltd.).

The results are collectively shown in Table 2.

TABLE 2

| | Weight average molecular weight | Substituent | Substitution degree |
|---|---|---|---|
| Compound 6 | 79,800 | Acetyl | 2.15 |
| Compound 7 | 63,300 | Acetyl | 2.22 |
| Compound 8 | 38,800 | Acetyl | 2.25 |
| Compound 9 | 11,000 | Acetyl | 2.21 |
| Compound 10 | 9,900 | Acetyl | 2.19 |
| Compound 11 | 42,300 | Acetyl | 2.78 |
| Compound 12 | 40,500 | Acetyl | 2.59 |
| Compound 13 | 39,000 | Acetyl | 2.48 |
| Compound 14 | 37,000 | Acetyl | 1.65 |
| Compound 15 | 36,100 | Acetyl | 0.38 |
| Compound 16 | 35,800 | Acetyl | 0.25 |
| Compound 17 | 42,500 | n-propionyl/acetyl | 2.05/0.35 |
| Compound 18 | 44,300 | n-butanoyl/acetyl | 1.88/0.55 |
| Compound 19 | 36,000 | n-hexanoyl | 0.55 |

Cellulose Derivatives C-1 to C-6 obtained in Synthesis Examples 1 to 6 (paragraphs [0107] to [0112]) of Japanese Patent No. 5,470,032 are set to Compounds 20 to 25, respectively, as shown in Table 3 below.

TABLE 3

| | Synthesis example of Japanese Patent No. 5,470,032 | Weight average molecular weight | Substituent | Substitution degree* |
|---|---|---|---|---|
| Compound 20 | C-1 | 185,000 | Methyl/propylene oxy acetyl + acetyl | 1.95/1.05 |
| Compound 21 | C-2 | 617,000 | Methyl/propylene oxy acetyl + acetyl | 1.84/1.16 |
| Compound 22 | C-3 | 770,000 | Methyl/propylene oxy acetyl + acetyl | 1.47/1.53 |
| Compound 23 | C-4 | 680,000 | Methyl/propylene oxy acetyl + acetyl | 1.45/1.55 |
| Compound 24 | C-5 | 402,000 | Methyl/propylene oxy propionyl + propionyl | 1.5/1.5 |
| Compound 25 | C-6 | 237,000 | Methyl/propylene oxy acetyl + acetyl | 1.43/1.57 |

*Substitution degree of alkyl/Sum of substitution degree of alkyleneoxyacyl and substitution degree of acyl Preparation of Pellets Kneading is performed with a twin screw kneading apparatus (TEX41SS manufactured by Toshiba Machine Co., Ltd.) at kneading temperatures in mixing ratio compositions shown in Examples 1 to 23 and Comparative Examples 1 to 10 shown in Table 4, so as to obtain resin composition pellets.

TABLE 4

| | Composition ratio | | | | | | Kneading temperature (° C.) |
|---|---|---|---|---|---|---|---|
| | Cellulose derivatives | | | | Plasticizer | | |
| | Kind | Amount (parts) | Kind | Amount (parts) | Kind | Amount (parts) | |
| Example 1 | Compound 7 | 100 | | | | | 200 |
| Example 2 | Compound 8 | 100 | | | | | 190 |
| Example 3 | Compound 9 | 100 | | | | | 180 |
| Example 4 | Compound 11 | 100 | | | | | 180 |
| Example 5 | Compound 12 | 100 | | | | | 190 |
| Example 6 | Compound 13 | 100 | | | | | 190 |
| Example 7 | Compound 14 | 100 | | | | | 190 |
| Example 8 | Compound 15 | 100 | | | | | 200 |
| Example 9 | Compound 16 | 100 | | | | | 200 |
| Example 10 | Compound 17 | 100 | | | | | 160 |
| Example 11 | Compound 18 | 100 | | | | | 160 |
| Example 12 | Compound 19 | 100 | | | | | 170 |
| Example 13 | Compound 8 | 95 | | | Compound 27 | 5 | 180 |
| Example 14 | Compound 8 | 90 | | | Compound 27 | 10 | 160 |
| Example 15 | Compound 8 | 85 | | | Compound 27 | 15 | 150 |
| Example 16 | Compound 7 | 90 | Compound 26 | 10 | | | 220 |
| Example 17 | Compound 7 | 80 | Compound 26 | 20 | | | 210 |
| Example 18 | Compound 7 | 70 | Compound 26 | 30 | | | 200 |
| Example 19 | Compound 8 | 90 | Compound 26 | 10 | | | 190 |
| Example 20 | Compound 8 | 80 | Compound 26 | 20 | | | 190 |
| Example 21 | Compound 8 | 70 | Compound 26 | 30 | | | 200 |
| Example 22 | Compound 7 | 75 | Compound 26 | 20 | Compound 27 | 5 | 200 |
| Example 23 | Compound 8 | 75 | Compound 26 | 20 | Compound 27 | 5 | 180 |
| Comparative Example 1 | Compound 6 | 100 | | | | | 200 |
| Comparative Example 2 | Compound 10 | 100 | | | | | 170 |
| Comparative Example 3 | Compound 6 | 90 | | | Compound 27 | 10 | 180 |

TABLE 4-continued

| | Composition ratio | | | | | |
|---|---|---|---|---|---|---|
| | Cellulose derivatives | | Plasticizer | | | Kneading |
| | Kind | Amount (parts) | Kind | Amount (parts) | Kind | Amount (parts) | temperature (° C.) |
| Comparative Example 4 | Compound 10 | 90 | | | Compound 27 | 10 | 160 |
| Comparative Example 5 | Compound 20 | 100 | | | | | 200 |
| Comparative Example 6 | Compound 21 | 100 | | | | | 205 |
| Comparative Example 7 | Compound 22 | 100 | | | | | 200 |
| Comparative Example 8 | Compound 23 | 100 | | | | | 200 |
| Comparative Example 9 | Compound 24 | 100 | | | | | 190 |
| Comparative Example 10 | Compound 25 | 100 | | | | | 190 |

In addition, details of Compounds 26 and 27 shown in Table 4 are presented below.

Compound 26: Dimethyl cellulose (L50 manufactured by Daicel Corporation, weight average molecular weight: 170,000)

Compound 27: Adipic acid ester-containing compound (Daifatty 101 manufactured by Daihachi Chemical Industry Co., Ltd.)

Hazen Color Number (APHA)

With respect to the obtained pellets, Hazen color numbers are measured by using a spectrophotometer and color meter (TZ6000 Nippon Denshoku Industries Co., Ltd.). The results are presented in Table 5.

Injection Molding

D2 test samples (60 mm in length, 60 mm in width and 2 mm in thickness) are prepared from the obtained pellets by injection molding using an injection molding machine (PNX40 manufactured by Nissei Plastic Industrial Co., Ltd.) at the molding temperatures (cylinder temperatures) and mold temperatures presented in Table 5.

Bad Odor Test

A bad odor test is performed by calculating a diffusion velocity of the acid in the points described below.

The obtained D2 test samples are put into a 0.24 L reactor vessel, nitrogen gas is casted from one side at a flow rate of 50 ml/min, the gas is collected on the other side, a collected amount of the acid is measured in a gas detector tube, and the diffusion velocity of the acid is calculated. In addition, the diffusion velocity of the acid is an index indicating strength of bad odor. Fast diffusion velocity of acid means strong bad odor. The results are presented in Table 5.

TABLE 5

| | Molding condition | | | |
|---|---|---|---|---|
| | Cylinder temperature (° C.) | Mold temperature (° C.) | APHA (—) | Acid diffusion velocity (mg/($m^2 \cdot h$)) |
| Example 1 | 200 | 40 | 40.8 | 0.02 |
| Example 2 | 190 | 40 | 39.6 | 0.04 |
| Example 3 | 180 | 40 | 38.5 | 0.01 |
| Example 4 | 180 | 40 | 48.9 | 0.28 |
| Example 5 | 190 | 40 | 48.5 | 0.44 |
| Example 6 | 190 | 40 | 39.5 | 0.05 |
| Example 7 | 190 | 40 | 49.8 | 0.31 |
| Example 8 | 200 | 40 | 45.8 | 0.26 |
| Example 9 | 200 | 40 | 46.2 | 0.25 |
| Example 10 | 160 | 40 | 40.3 | 0.09 |
| Example 11 | 160 | 40 | 40.1 | 0.04 |
| Example 12 | 170 | 40 | 47.9 | 0.36 |
| Example 13 | 180 | 40 | 40.8 | 0.02 |
| Example 14 | 160 | 40 | 40.1 | 0.04 |
| Example 15 | 150 | 40 | 39.6 | 0.05 |
| Example 16 | 220 | 40 | 38.6 | 0.08 |
| Example 17 | 210 | 40 | 39.2 | 0.02 |
| Example 18 | 200 | 40 | 48.3 | 0.24 |
| Example 19 | 190 | 40 | 39.8 | 0.08 |
| Example 20 | 190 | 40 | 40.9 | 0.05 |
| Example 21 | 200 | 40 | 41.1 | 0.04 |
| Example 22 | 200 | 40 | 41.2 | 0.02 |
| Example 23 | 180 | 40 | 39.6 | 0.04 |
| Comparative Example 1 | 200 | 40 | 52.6 | 20.55 |
| Comparative Example 2 | 170 | 40 | 51.2 | 21.87 |
| Comparative Example 3 | 180 | 40 | 185.5 | 44.58 |
| Comparative Example 4 | 160 | 40 | 179.5 | 41.26 |
| Comparative Example 5 | 200 | 40 | 215.3 | 39.65 |
| Comparative Example 6 | 205 | 40 | 187.5 | 41.56 |
| Comparative Example 7 | 200 | 40 | 205.3 | 42.33 |
| Comparative Example 8 | 200 | 40 | 211.2 | 40.25 |
| Comparative Example 9 | 190 | 40 | 250.3 | 38.65 |
| Comparative Example 10 | 190 | 40 | 218.3 | 40.88 |

It is found that the resin molded articles obtained by molding the resin compositions (Examples 1 to 23) of which Hazen color numbers are 50 or lower have slow acid diffusion velocity compared with the resin molded articles obtained by molding the resin compositions (Comparative Examples 1 to 10) of which Hazen color numbers are greater than 50. That is, it is found that the resin molded articles in which the generation of the bad odor is decreased may be obtained by molding the resin compositions according to Examples 1 to 23.

In addition, it is found that the molded articles obtained by molding resin compositions (Examples 1 to 3, 6, 10, 11, and 13 to 23) in which substitution degrees of acyl groups in cellulose derivatives are in the range of 1.8 to 2.5 have slow acid diffusion velocity, compared with the resin molded articles obtained by molding resin compositions (Examples 7 to 9, and 12) in which the substitution degrees of the acyl groups are less than 1.8, and the resin compositions (Examples 4 and 5) in which substitution degrees of the acyl groups is greater than 2.5.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a cellulose derivative represented by the following formula (I):

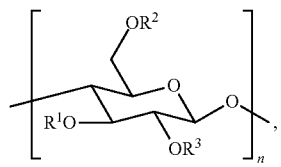

formula (I)

where n represents an integer of 2 or greater, $R^1$, $R^2$, and $R^3$ each independently represent a hydrogen atom or an acyl group, and plural acyl groups are all identical,
wherein a Hazen color number (APHA) of the resin composition is in a range of from 5 to 40.

2. The resin composition according to claim 1, wherein the Hazen color number (APHA) is in a range of from 5 to 30.

3. The resin composition according to claim 1, wherein a weight average molecular weight of the cellulose derivative is 10,000 or greater and less than 75,000.

4. The resin composition according to claim 1, wherein a weight average molecular weight of the cellulose derivative is in a range of from 20,000 to 50,000.

5. The resin composition according to claim 1, wherein a substitution degree of the acyl group is in a range of from 1.8 to 2.5.

6. The resin composition according to claim 3, wherein a substitution degree of the acyl group is in a range of from 1.8 to 2.5.

7. The resin composition according to claim 5, wherein the substitution degree of the acyl group is in a range of from 2.0 to 2.5.

8. The resin composition according to claim 6, wherein the substitution degree of the acyl group is in a range of from 2.0 to 2.5.

9. The resin composition according to claim 5, wherein the substitution degree of the acyl group is in a range of from 2.2 to 2.5.

10. The resin composition according to claim 6, wherein the substitution degree of the acyl group is in a range of from 2.2 to 2.5.

11. The resin composition according to claim 1, wherein a ratio occupied by the cellulose derivative with respect to a total amount of the resin composition is 70% by weight or greater.

12. The resin composition according to claim 3, wherein a ratio occupied by the cellulose derivative with respect to a total amount of the resin composition is 70% by weight or greater.

13. The resin composition according to claim 5, wherein a ratio occupied by the cellulose derivative with respect to a total amount of the resin composition is 70% by weight or greater.

14. The resin composition according to claim 6, wherein a ratio occupied by the cellulose derivative with respect to a total amount of the resin composition is 70% by weight or greater.

15. A resin molded article comprising:
the resin composition according to claim 1.

16. The resin molded article according to claim 15, which is molded by injection molding.

17. The resin composition according to claim 1, wherein $R^1$, $R^2$, and $R^3$ each independently represent a hydrogen atom or an acetyl group.

18. A resin composition comprising:
a cellulose derivative represented by the following formula (I):

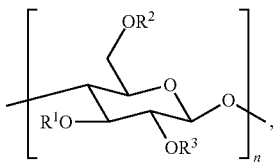

formula (I)

where n represents an integer of 2 or greater, $R^1$, $R^2$, and $R^3$ each independently represent a hydrogen atom or an acyl group, and plural acyl groups are all identical,
wherein:
a Hazen color number (APHA) of the resin composition is 50 or lower, and
a weight average molecular weight of the cellulose derivative is 10,000 or greater and less than 75,000.

19. A resin composition comprising:
a cellulose derivative represented by the following formula (I):

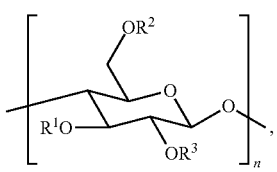

formula (I)

where n represents an integer of 2 or greater, $R^1$, $R^2$, and $R^3$ each independently represent a hydrogen atom or an acyl group, and plural acyl groups are all identical, wherein:

a Hazen color number (APHA) of the resin composition is 50 or lower, and a substitution degree of the acyl group is in a range of from 1.8 to 2.5.

* * * * *